Patented May 17, 1949

2,470,545

UNITED STATES PATENT OFFICE 2,470,545

VULCANIZING RUBBER

Edward S. Blake, Nitro, W. Va., assignor to Monsanto Chemical Company, St. Louis, Mo., a corporation of Delaware No Drawing. Application June 22, 1944,
Serial No. 541,661

12 Claims. (Cl. 260—79)

This invention relates to the vulcanization of sulfur vulcanizable thermoplastic materials. More particularly the present invention relates to an improved process of vulcanizing a sulfur vulcanizable rubber and to the vulcanized rubber products obtained thereby.

An object of this invention is to vulcanize a sulfur vulcanizable thermoplastic material by the aid of a new class of organic vulcanizing agents. Another object is to provide an improved process of vulcanizing a sulfur vulcanizable rubber. Still further objects are to provide rubber products of improved physical properties and to advance the art.

In accordance with this invention it has been discovered that phenolic sulfides containing more than one atomic weight proportion of sulfur for each molecular weight proportion of phenol comprise a valuable group of direct vulcanizing agents. These phenolic sulfides vulcanize sulfur vulcanizable thermoplastic materials in the absence of free sulfur. While the vulcanizing activity presumably is due to the sulfur contained in the molecule of the phenolic sulfide, this is not known with certainly. It is noteworthy that the vulcanizates frequently possess properties quite different from ordinary sulfur vulcanizates.

One method of preparing phenolic sulfides is to react a phenol with a sulfur chloride. In this connection, it is not at all necessary to use pure compounds in the practice of this invention. The crude reaction products of phenols and sulfur chlorides which undoubtedly comprise a mixture of products are entirely satisfactory. While a wide variety of phenolic sulfides useful in the practice of the present invention can be prepared by reacting phenols with various proportions of sulfur chloride, optimum results have been obtained with products corresponding to phenolic tetrasulfides, that is to say, the products made by reacting a phenol and sulfur monochloride in equi-molecular proportions. Probably both phenol tetrasulfides and polymers are formed. Examples of types of compounds which may be used in the present invention comprise R—S₃—R; R—S₄—R; R—S₂—R—S₂—R—S₂—R; R—S₂—R—S—R—S₂—R and R—S₄—R—S₂—R—S₄—R where R is an hydroxy substituted aryl nucleus. The polymers may be prepared by reacting a preformed phenol sulfide with a further quantity of a sulfur chloride. Thus, a phenol disulfide may be brought into reaction with sulfur dichloride using two mols of the former to one of the latter. The same treatment may be carried out with phenol trisulfides and phenol tetrasulfides. Furthermore, sulfur monochloride can be substituted for sulfur dichloride. Preferably, the reactions are conducted in an inert solvent medium such as chloroform, ethylene dichloride, carbon tetrachloride, benzene or ether but this is not essential. Typical examples of products found to be highly effective vulcanizing agents comprise the phenol tetrasulfides prepared by reacting in equi-molecular proportions of sulfur monochloride and each of the following: phenol; catechol; o-chlor phenol; hydroquinone; o-cresol; benzyl phenol; p-chlor phenol; β-naphthol and p-nitro phenol. Details of the preparations of some of these are given below and others can be prepared in similar manner.

Example I

A crude mixture of ortho and para benzyl phenol having a crystallizing point of 48.2° C. was reacted with an equi-molecular proportion of sulfur monochloride. Substantially 47 parts by weight of benzyl phenol (substantially 0.25 molecular proportion) was dissolved in substantially 316 parts by weight of carbon tetrachloride and to this solution 34 parts by weight of sulfur monochloride (substantially 0.25 molecular proportion) dissolved in 316 parts by weight of carbon tetrachloride was added gradually. A slightly exothermic reaction set in immediately. The mixture was heated to refluxing temperature for about two hours after the sulfur chloride had been added and then nitrogen passed through the mixture to remove any residual hydrogen chloride. The solvent was then removed preferably by distillation. The residue comprising the desired benzyl phenol tetrasulfide was a brown resin and was obtained in substantially theoretical yield. It contained approximately 24.6% sulfur.

Example II

Substantially 72 parts by weight of β-naphthol (approximately 0.5 molecular proportion) was dissolved in substantially 750 parts by weight of chloroform and the solution filtered to remove a small amount of impurities. Substantially 67 parts by weight of sulfur monochloride (substantially 0.5 molecular proportion) diluted with substantially 225 parts by weight of chloroform was slowly added to the β-naphthol solution while keeping the temperature at about 40° C. Stirring was continued until hydrogen chloride ceased to be evolved and then the solvent removed as for example by evaporation. The residue comprising the desired β-naphthol tetrasulfide was a soft black resin and was obtained in substantially theoretical yield.

Example III

Substantially 66 parts by weight of catechol (substantially 0.6 molecular proportion) was dissolved in a suitable solvent as for example substantially 500 parts by weight of dioxane and to the solution there was added slowly with efficient stirring 81 parts by weight (substantially 0.6 molecular proportion) of sulfur monochloride.

The temperature rose to 60° C. during the addition but was kept from going any higher by suitable cooling. The reaction mixture was allowed to stand several hours after the addition of the sulfur chloride and the solvent then removed by distillation under diminished pressure. The residue was washed with water, then dilute bicarbonate solution and redissolved in acetone. The acetone solution was stirred over bicarbonate, filtered and the acetone removed by distillation. The residue comprising the desired catechol tetrasulfide was a dark resinous product. Catechol hexasulfide was prepared by reacting substantially 2 molecular proportions of catechol with substantially 3 molecular proportions of sulfur monochloride in similar manner.

*Example IV*

A solution of substantially 67.5 parts by weight (substantially 0.5 molecular proportion) of sulfur monochloride in 316 parts by weight of carbon tetrachloride was slowly added to 47 parts by weight (substantially 0.5 molecular proportion) of phenol dissolved in 316 parts by weight of carbon tetrachloride. After the addition of approximately half of the sulfur chloride the temperature was raised to 60° C. in order to make the reaction mass more fluid during the addition of the remainder. The reaction mixture was heated to refluxing temperature for about 12 hours after the addition of the sulfur chloride and then the solvent was removed by any convenient means. The residue comprising the desired phenol tetrasulfide was a soft brown resin. Phenol hexasulfide was prepared in similar manner by reacting 2 molecular proportions of phenol and 3 molecular proportions of sulfur monochloride in an inert solvent such as benzene, ether or carbon tetrachloride. The product was a brittle yellow resin.

As specific embodiments of the invention but in nowise limitative of the same, rubber stocks were compounded comprising

| Stock | A | B | C | D | E |
|---|---|---|---|---|---|
| | Parts by weight | Parts by weight | Parts by weight | Parts by weight | Parts by weight |
| Smoked sheets rubber | 100 | 100 | 100 | 100 | 100 |
| Whiting | 148.8 | 148.8 | 148.8 | 148.8 | 148.8 |
| Zinc oxide | 64.5 | 64.5 | 64.5 | 64.5 | 64.5 |
| Ozokerite | 2.5 | 2.5 | 2.5 | 2.5 | 2.5 |
| Stearic acid | 0.6 | 0.6 | 0.6 | 0.6 | 0.6 |
| Carbon black | 0.8 | 0.8 | 0.8 | 0.8 | 0.8 |
| Phenyl β-naphthylamine | 2.4 | 2.4 | 2.4 | 2.4 | 2.4 |
| Piperidine cyclopentamethylene dithiocarbamate | 2.0 | 2.0 | 2.0 | 2.0 | 2.0 |
| Catechol tetrasulfide | 2.5 | | | | |
| Catechol hexasulfide | | 2.15 | | | |
| Phenol hexasulfide | | | 2.3 | | |
| O-chlor phenol tetrasulfide | | | | 3.0 | |
| Hydroquinone tetrasulfide | | | | | 2.7 |

The stocks so compounded were cured by heating in a press for different periods of time and the temperature of 25 pounds of steam pressure per square inch. The modulus and tensile properties of the cured rubber products are given below.

*Table I*

| Stock | Cure Time in Mins. | Modulus of Elasticity in lbs./in.² at elongations of— | | Tensile at Break in lbs./in.² | Ult. Elong., Per Cent |
|---|---|---|---|---|---|
| | | 200% | 400% | | |
| A | 45 | 575 | 1,430 | 1,680 | 450 |
| B | 45 | 680 | 1,620 | 1,620 | 400 |
| C | 45 | 550 | 1,350 | 1,675 | 485 |
| D | 45 | 585 | 1,275 | 1,710 | 500 |
| E | 45 | 465 | 1,120 | 1,300 | 440 |
| A | 60 | 585 | 1,440 | 1,785 | 460 |
| B | 60 | 690 | 1,625 | 1,625 | 400 |
| C | 60 | 565 | 1,410 | 1,740 | 485 |
| D | 60 | 590 | 1,290 | 1,675 | 500 |
| E | 60 | 430 | 1,080 | 1,300 | 440 |

The above data show the strong vulcanizing action of phenol sulfides when incorporated into natural rubber. These products are also useful in other sulfur vulcanizable thermoplastic materials. As further specific embodiments of the invention stocks were compounded comprising

| Stock | F | G | H | J | K | L |
|---|---|---|---|---|---|---|
| | Parts by weight | Parts by weight | Parts by weight | Parts by weight | Parts by weight | Parts by weight |
| Butadiene-styrene copolymer | 100 | 100 | 100 | 100 | 100 | 100 |
| Carbon black | 40 | 40 | 40 | 40 | 40 | 40 |
| Zinc oxide | 3 | 3 | 3 | 3 | 3 | 3 |
| Mineral rubber | 4 | 4 | 4 | 4 | 4 | 4 |
| Aromatic hydrocarbon softener | 4 | 4 | 4 | 4 | 4 | 4 |
| N-cyclohexyl 2-benzothiazole sulfenamide | 1.2 | 2 | 2 | 2 | 2 | 2 |
| Sulfur | 1.75 | | | | | |
| Phenol tetrasulfide | | 4.9 | | | | |
| Benzyl phenol tetrasulfide | | | 6.1 | | | |
| P-chlor phenol tetrasulfide | | | | 6.4 | | |
| β-naphthol tetrasulfide | | | | | 4.8 | |
| O-cresol tetrasulfide | | | | | | 4.05 |

The stocks so compounded were vulcanized in the usual manner by heating in a press for different periods of time at 142° C. The vulcanized products were then artificially aged by heating in an oven for 24 hours at 100° C. The physical properties of the unaged and aged cured rubber products are given below.

*Table II*

| Stock | Cure Time in Mins. | Aging | Modulus of Elasticity in lbs./in.² at Elongation of 300% | Tensile at Break in lbs./in.² | Ult. Elong., percent |
|---|---|---|---|---|---|
| F | 30 | unaged | 905 | 2,580 | 575 |
| F | 30 | aged | 1,550 | 2,150 | 380 |
| G | 30 | unaged | 670 | 2,415 | 725 |
| G | 30 | aged | 1,460 | 3,100 | 530 |
| H | 30 | unaged | 628 | 2,615 | 700 |
| H | 30 | aged | 1,051 | 2,730 | 550 |
| J | 30 | unaged | 1,185 | 2,790 | 580 |
| J | 30 | aged | 1,600 | 2,445 | 380 |
| K | 30 | unaged | 540 | 2,500 | 750 |
| K | 30 | aged | 968 | 2,790 | 610 |
| L | 30 | unaged | 363 | 1,960 | 830 |
| L | 30 | aged | 950 | 2,305 | 570 |
| F | 60 | unaged | 885 | 2,880 | 620 |
| F | 60 | aged | 1,725 | 1,915 | 325 |
| G | 60 | unaged | 810 | 2,670 | 690 |
| G | 60 | aged | 1,325 | 3,120 | 580 |
| H | 60 | unaged | 735 | 2,735 | 650 |
| H | 60 | aged | 1,060 | 2,845 | 570 |
| J | 60 | unaged | 1,130 | 2,735 | 555 |
| J | 60 | aged | 1,425 | 2,365 | 465 |
| K | 60 | unaged | 595 | 2,865 | 710 |
| K | 60 | aged | 850 | 2,700 | 620 |
| L | 60 | unaged | 640 | 2,270 | 690 |
| L | 60 | aged | 888 | 2,650 | 625 |

The above data illustrate the strong vulcanizing activity of phenolic sulfides when incorporated into the copolymer of butadiene and styrene and further show that after artificial aging the stocks vulcanized by the aid of phenolic sulfides are markedly superior to stocks vulcanized in the conventional manner with ordinary sulfur.

As further specific embodiments of the invention, stocks were compounded comprising

| Stock | M | N |
|---|---|---|
| | Parts by weight | Parts by weight |
| Copolymer of butadiene and acrylic nitrile | 100 | 100 |
| Carbon black | 50 | 50 |
| Zinc oxide | 5 | 5 |
| Stearic acid | 1 | 1 |
| P-chlor phenol tetrasulfide | 6.8 | |
| β-naphthol tetrasulfide | | 6.8 |
| N-cyclohexyl 2-benzothiazole sulfenamide | 1.5 | 1.5 |

The stocks so compounded were vulcanized by heating in a press in the usual manner for different periods of time at 148° C. The physical properties of the vulcanizates are given below.

*Table III*

| Stock | Cure Time in Mins. | Modulus of Elasticity in lbs./in.$^2$ at Elongation of 300% | Tensile at Break in lbs./in.$^2$ | Ult. Elong., percent |
|---|---|---|---|---|
| M | 60 | 2,930 | 4,475 | 440 |
| N | 60 | 3,650 | 4,085 | 330 |
| M | 90 | 3,380 | 4,750 | 400 |
| N | 90 | 3,830 | 4,700 | 370 |

The above data show that phenolic sulfides are powerful vulcanizing agents for copolymers of butadiene and acrylic nitrile.

Again, the foregoing examples are intended to be illustrative of the invention and not a limitation thereof. Obviously, other phenol sulfides than those particularly mentioned may be used and other methods of making phenolic sulfides employed where convenient or desirable. Other sulfur vulcanizable thermoplastic materials may be employed and other compounding and accelerating ingredients than those particularly set forth. The invention is limited solely by the following claims.

What is claimed is:

1. The process of vulcanizing a sulfur vulcanizable rubber comprising a conjugated butadiene hydrocarbon polymer which comprises heating the said rubber in the presence of, as the sole vulcanizing agent, at least 2.15 but not more than 6.8 parts by weight on the rubber of a di(hydroxy aryl)sulfide containing more than one atomic weight proportion of sulfur for each molecular weight proportion of hydroxy aryl radical.

2. The process of vulcanizing a sulfur vulcanizable rubber comprising a conjugated butadiene hydrocarbon polymer which comprises heating the said rubber in the presence of, as the sole vulcanizing agent, at least 2.15 but not more than 6.8 parts by weight on the rubber of a di(hydroxy aryl) tetrasulfide.

3. The process of vulcanizing natural rubber which comprises heating rubber in the presence of, as the sole vulcanizing agent, at least 2.15 but not more than 6.8 parts by weight on the rubber of a di(hydroxy aryl) tetrasulfide.

4. The process of vulcanizing a sulfur vulcanizable rubber comprising a conjugated butadiene hydrocarbon polymer which comprises heating the said rubber in the presence of, as the sole vulcanizing agent, at least 2.15 but not more than 6.8 parts by weight on the rubber of a mixture of di(hydroxy aryl)sulfides obtained as a residue after removal of the solvent by reacting a monohydric phenol and sulfur monochloride in substantially equimolecular proportions in the presence of an inert organic solvent.

5. The process of vulcanizing a sulfur vulcanizable rubber comprising a copolymer of butadiene and styrene which comprises heating the copolymer in the presence of at least 2.15 but not more than 6.8 parts by weight on the copolymer of di(β-hydroxy naphthtyl) tetrasulfide.

6. The process of vulcanizing a sulfur vulcanizable rubber comprising a copolymer of butadiene and styrene which comprises heating the copolymer in the presence of at least 2.15 but not more than 6.8 parts by weight on the copolymer of di(hydroxy phenyl) tetrasulfide.

7. The vulcanized product obtained by heating a sulfur vulcanizable rubber comprising a conjugated butadiene hydrocarbon polymer in the presence of, as the sole vulcanizing agent, at least 2.15 but not more than 6.8 parts by weight on the rubber of a di(hydroxy aryl)sulfide containing more than one atomic weight proportion of sulfur for each molecular weight proportion of hydroxy aryl radical.

8. The vulcanized product obtained by heating a sulfur vulcanizable rubber comprising a conjugated butadiene hydrocarbon polymer in the presence of, as the sole vulcanizing agent, at least 2.15 but not more than 6.8 parts by weight on the rubber of di(hydroxy aryl) tetrasulfide.

9. The vulcanized product obtained by heating natural rubber in the presence of, as the sole vulcanizing agent, at least 2.15 but not more than 6.8 parts by weight on the rubber of a di(hydroxy aryl) tetrasulfide.

10. The vulcanized product obtained by heating a sulfur vulcanizable rubber-like copolymer of butadiene and styrene in the presence of at least 2.15 but not more than 6.8 parts by weight on the copolymer of di(β-hydroxy naphthyl)-tetrasulfide.

11. The vulcanized product obtained by heating a sulfur vulcanizable rubber-like copolymer of butadiene and styrene in the presence of at least 2.15 but not more than 6.8 parts by weight on the copolymer of di(hydroxy phenyl) tetrasulfide.

12. The vulcanized product obtained by heating a sulfur vulcanizable rubber comprising a conjugated butadiene hydrocarbon polymer in the presence of, as the sole vulcanizing agent, at least 2.15 but not more than 6.8 parts by weight on the rubber of a mixture of di(hydroxy aryl)sulfides obtained as a residue after removal of the solvent by reacting a monohydric phenol and sulfur monochloride in substantially equimolecular proportions in the presence of an inert organic solvent.

EDWARD S. BLAKE.

REFERENCES CITED

The following references are of record in the file of this patent:

UNITED STATES PATENTS

| Number | Name | Date |
|---|---|---|
| 1,849,489 | Howland | Mar. 15, 1932 |
| 2,359,122 | Kirby et al. | Sept. 26, 1944 |

FOREIGN PATENTS

| Number | Country | Date |
|---|---|---|
| 359,045 | Great Britain | Oct. 19, 1931 |